Dec. 29, 1959

F. TSCHAPPU 2,919,406

POWER MEASURING INSTRUMENT

Filed July 26, 1955

INVENTOR
Fred Tschappu

Morgan, Finnegan, Durham & Pine
ATTORNEYS

Dec. 29, 1959 F. TSCHAPPU 2,919,406
POWER MEASURING INSTRUMENT
Filed July 26, 1955 2 Sheets-Sheet 2
Fig. 4.
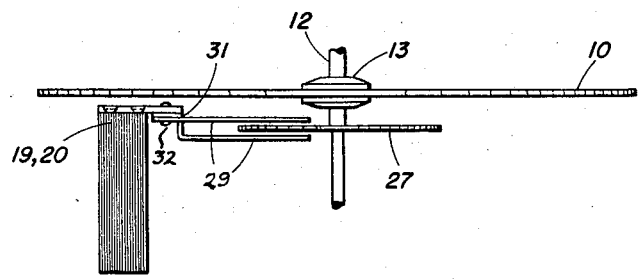
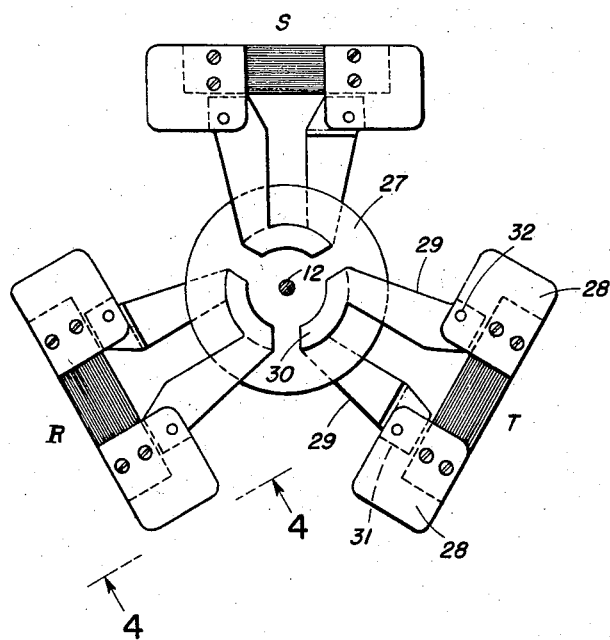
Fig. 3.
INVENTOR
Fred Tschappu
Morgan, Finnegan, Durham & Pine
ATTORNEYS

United States Patent Office 2,919,406
Patented Dec. 29, 1959

2,919,406

POWER MEASURING INSTRUMENT

Fred Tschappu, Zug, Switzerland, assignor to Landis & Gyr, A.G., Zug, Switzerland, a body corporate of the Confederation of Switzerland Application July 26, 1955, Serial No. 524,388

Claims priority, application Switzerland July 27, 1954

6 Claims. (Cl. 324—107)

This invention relates to power measuring instruments and more specifically to an improved induction meter that may be used among other things for the measurement of power consumed in polyphase alternating current power supply systems.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings referred to herein and constituting a part hereof, illustrate one embodiment of the invention and together with the description, serve to explain the principles of the invention.

Of the drawings:

Fig. 3 is a cross sectional view of Fig. 1 taken along the line 3—3 thereof; and Fig. 4 is a fragmentary view of Fig. 3 taken in the direction of the arrows 4 of Fig. 3.

Figure 1:
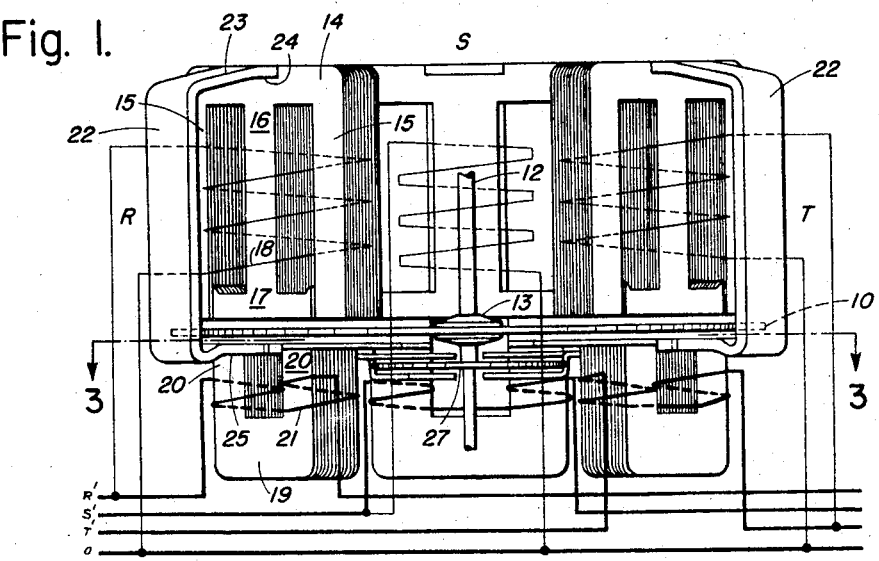
Fig. 1 is a side elevational view of certain elements of an induction wattmeter in accordance with the invention with certain components thereof shown in diagrammatic form for clarity.
Figure 2:
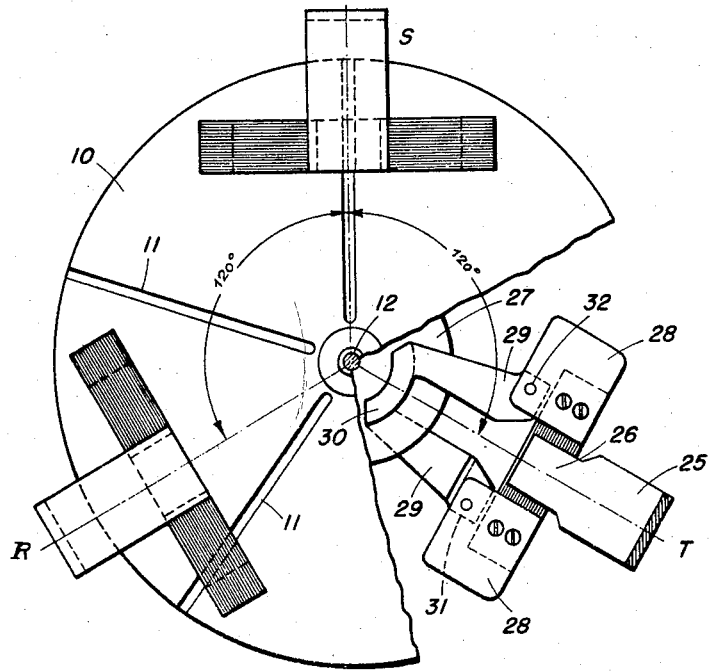
Fig. 2 is a plan view of the embodiment of the invention shown in Fig. 1 with a portion thereof broken away to expose underlying elements.

While numerous efforts have been made to develop compact, relatively low cost meters for the measurement of polyphase power, these efforts have not resulted in satisfactory devices for several reasons. Present devices for measuring power in a three phase four wire distribution system involve the use of three discs each having an individual potential and current coil for driving it. This procedure prevents mutual leakage between the driving and the stray fluxes of the three systems but requires a relatively large meter structure and a heavy armature carrying the several discs. Efforts have been made to utilize a single disc with two driving systems each including a potential and current coil at diametrically opposite points on the disc and a third driving system at right angles to the others and to one side of the armature shaft carrying the single disc. This procedure was unsatisfactory because of the small distances between the several coils and the angular relationship therebetween caused substantial interference between the driving and the stray fluxes and produced an asynchronous interference factor that introduced a substantial error in the instrument with the direction of the error depending upon the phase sequence.

While it is possible to eliminate some of the rotating field error by making the single driving disc of a plurality of relatively thin slotted aluminum discs cemented one to the other, direct magnetic coupling between the several driving elements exists that adversely affects the accuracy of the instrument. Although some of this undesirable magnetic coupling can be eliminated by means of magnetically insulated attachments of the driving systems to the supporting frame, it is not possible to reduce it sufficiently to produce a satisfactory instrument. This invention overcomes the aforementioned disadvantages with prior polyphase wattmeters and methods for correcting errors and provides an improved arrangement of driving elements and compensating means that will eliminate the effect of magnetic coupling and the interlinkage of stray flux so that a highly accurate and dependable instrument is obtained. This is attained in part through the utilization in a three phase system for instance of three driving coils disposed uniformly about a single disc and means for producing a rotary force in opposition to that of the disc to automatically compensate for errors in disc rotation.

Another object of the invention resides in the provision of an improved polyphase wattmeter that is characterized by its compactness, simplicity and relatively low cost. This is attained through the utilization of the magnetic fields generated by the driving coils themselves to effect automatic and precise neutralization of stray fields and fluxes that heretofore have produced serious errors in polyphase wattmeter measurements utilizing a single disc.

It has been found that when a single homogeneous aluminum disc is used in conjunction with a plurality of driving coils for the measurement of power that the error produced by stray fields and fluxes has a sign of one polarity, i.e., tends to make the meter read high for one particular phase sequence. On the other hand the use of a slotted laminated disc as referred to in the introduction produces an error having a sign of opposite polarity to that of the homogeneous disc, i.e., tends to make the meter read low for the same phase sequence. Moreover, the errors produced by the different discs are not only opposite in sign but are also of different magnitude. According to the invention a single laminated and slotted driving disc is provided with the three driving systems, each including a voltage and current coil, spaced at equal angles about the disc. This symmetrical arrangement of driving units produces a substantially uniform and symmetrical flux distribution and the errors associated with the interlinking of the distributed flux are thus more precisely defined. This error is overcome through the utilization of a small homogeneous compensation disc that is driven, in much the same way as an induction motor is driven, by the action of fluxes produced by the current coils. By properly adjusting the size of this disc and the size and relation of pole pieces which magnetically couple fluxes from the current coils to the region of the disc, precise and accurate compensation for errors is accomplished.

More specifically and with reference to the figures the meter in accordance with the invention includes a large rotating disc 10 formed of a multiplicity of laminations, each having a number of radially disposed slots 11 with the slots of each layer or lamination being offset from the others. In the case where six layers of aluminum sheets are used and each sheet is provided with five uniformly distributed slots, the angle between the slots of adjacent sheets or layers will be approximately 12 degrees. The disc 10 is mounted on a central rotating shaft 12 and is provided with a hub 13 for securing it to the shaft.

For clarity the details of the supporting frame of the meter now being described have been omitted and the windings on the several driving systems have been shown in diagrammatic form.

The illustrated embodiment of the invention is intended for use on a three phase four wire power system and includes three separate voltage and current coil assemblies generally denoted by the letters R, S and T spaced at 120 degree intervals about the disc 10. Each voltage coil is provided with a laminated core 14 having outer vertical legs 15 and a central leg 16. The central leg terminates in a transverse pole piece 17, the ends of which terminate in spaced relationship from the lower ends of the legs 15 to form relatively small air gaps therebetween. The coil 18 is wound about the central leg 16 in the usual manner.

The current coil of each driving assembly includes a U-shaped core 19 having upwardly extending legs 20 about which the current coil 21 is wound. Each of the driving elements are identical in structure with the current and potential coils disposed on opposite sides of the disc 10 and in alignment one with the other. The potential coil 18 of the driving assembly R is connected between the conductor R' and common or neutral wire 0, while its associated current coil 21 is connected in series with the conductor R'. The driving systems S and T are similarly connected with the conductors S' and T' and the neutral wire 0 in similar manner.

A voltage counter pole for each phase is formed by means of a U-shaped member 22 associated with the potential coil of each driving assembly and formed of a magnetic material such as iron or the like. The upper leg 23 of each U-shaped member 22 lies within a slot 24 in the upper end of the core 14 while the lower leg 25 is provided with a tapered pole piece 26 disposed between the legs 20 of the core 19 of the current coil substantially as illustrated.

The size and shape of the current and voltage coils of each driving assembly can be varied in any desired manner depending on the general meter configuration desired. This advantage is attained in part by reason of the disposition of the several driving assemblies about the disc 10 so that ample space is provided for each assembly and in part by the improved compensation means that will eliminate errors produced by magnetic coupling and the production of an undesirable rotary field in the disc.

It was pointed out above that the rotating magnetic field error associated with the laminated disc 10 is of opposite sign to that produced when a solid disc is utilized. With the meter connected in a normal phase sequence and with the rotary field running in a direction contrary to the direction of rotation the rotary field error will have a negative sign. It has been found that this negative error can be effectively overcome in the illustrated apparatus by providing a somewhat smaller disc 27 disposed below the disc 10 and carried by the shaft 12. Rotation is imparted to the disc 27 by means of the magnetic field generated by the three current coils, the resultant field having a rotating component which induces eddy currents in the disc thus producing rotation by induction in a direction which depends on the phase sequence. For this purpose each leg 20 of the current coils is provided with a plate 28 of magnetic material, an elongated arm 29 secured to and carried by the plate 28 and an auxiliary pole piece 30 preferably formed integrally with the arm 29 of an arcuate shape. One auxiliary pole piece associated with each of the current coils is disposed on the top side of the disc 27 while the other auxiliary pole piece 30 of each coil is disposed on the bottom side of the disc 27. This arrangement may be more clearly observed in Figs. 3 and 4 of the drawings. Inasmuch as the rotary field error produced by using a solid aluminum disc 27 is in a positive direction, by selecting a proper size disc 27 and by properly aligning the pole pieces 30 with the disc a positive error will be produced to exactly counter balance the negative error produced by the laminated disc 10. In this way accurate and precise compensation is attained. Moreover since the change in magnitude of the errors of each of the discs will vary proportionally with the load, uniform accuracy is attained throughout the entire load range. For best results it is preferable to magnetically decouple the arms 29 carrying the pole pieces 30 from the plates 28 overlying the current coil pole pieces by means of brass plates 31 disposed between each of the arms 29 and their associated plates 28. Each assembly is then held together by a brass rivet 32.

In order to attain optimum operation of the structure as defined above the disc 27 should be approximately one-third the diameter of the disc 10 and the pole pieces 30 should form arcs of a circle disposed generally concentrically of the disc 27. It is also desirable to maintain the gaps between the legs 29 and their associated plates 28 as small as possible with the distances between adjacent pole pieces 30 being as small as possible. For convenience in assembly the gaps between adjoining sets of pole pieces 30 are made slightly wider than the diameter of the shaft 12 so that the latter may be easily inserted along with the discs 10 and 27 after the assembly of the driving coils has been completed.

An important advantage of this invention resides in the fact that the compensating means need not be adjusted individually for each meter. After suitable tests to determine the size and relationship of the several elements constituting the compensating means, normal manufacturing tolerances in the fabrication and assembly of the elements will produce highly accurate polyphase meters that will maintain their accuracy from very small loads to overloads of as much as 300 to 400 percent.

While only one embodiment of the invention has been shown and described, it is apparent that modifications, alterations and changes may be made without departing from the true scope and spirit thereof.

What is claimed is:

1. An induction meter comprising a central rotatably mounted shaft, a slotted disc fixedly secured to said shaft, three potential coils magnetically coupled to one side of said disc and equally spaced about said shaft, three current coils disposed on the other side of said disc in substantial alignment with the potential coils, a second, solid, disc mounted on said shaft and spaced from the other side of the first said disc, three arcuate auxiliary pole pieces each magnetically coupled with one pole of each current coil and positioned uniformly about one side of said second disc to produce magnetic linkage therebetween and induce eddy currents in said second disc and three other auxiliary arcuate pole pieces each magnetically coupled with the other poles of said current coils and positioned uniformly about the other side of said second disc to produce magnetic linkage therebetween and induce eddy currents in said second disc whereby torque imparted to said second disc will modify the torque imparted to the first said disc to compensate for errors in rotation of the first said disc produced by the effect of stray fluxes thereon.

2. An induction meter according to claim 1 wherein said second disc is smaller in diameter than the first said disc.

3. An induction meter according to claim 1 wherein the gaps between adjacent pole pieces associated with said second disc slightly exceeds the diameter of said shaft.

4. In a polyphase induction-type watt hour meter comprising a central rotatably mounted shaft, a slotted first disc mounted on said shaft, at least three driving means each including a potential coil and core and a current coil and core, said driving means being positioned uniformly about said first disc with the potential coils and cores symmetrically disposed on one side of said first disc and the current coils and cores disposed oppositely of said potential cores and coils on the other side of said first disc; rotary-field-error compensating means comprising a second homogeneous disc mounted on said shaft and a plurality of auxiliary pole pieces coupled to each of said current cores, said auxiliary pole pieces extending from said current cores to said second disc and operable to couple magnetic flux associated with said current cores to said second disc whereby a torque is developed on said second disc to provide compensation for errors in rotation of said first disc.

5. A device according to claim 4 in which there are two auxiliary pole pieces associated with each current coil.

6. Apparatus according to claim 4 in which said auxiliary pole pieces are secured to non-magnetic members and said non-magnetic members are secured to said current cores.

References Cited in the file of this patent

UNITED STATES PATENTS

| | | |
|---|---|---|
| 941,467 | Stanley | Nov. 30, 1909 |
| 2,134,575 | Pratt | Oct. 25, 1938 |
| 2,243,130 | Sherwood | May 27, 1941 |
| 2,713,148 | Thevenon | July 12, 1955 |

FOREIGN PATENTS

| | | |
|---|---|---|
| 239,546 | Great Britain | Jan. 7, 1926 |
| 433,362 | Germany | Aug. 27, 1926 |